United States Patent
Schrubbe

(10) Patent No.: US 10,969,214 B2
(45) Date of Patent: Apr. 6, 2021

(54) POSITION SENSOR WITH WIEGAND WIRE, POSITION MAGNET(S) AND RESET MAGNET

(71) Applicant: Joral LLC, Mukwonago, WI (US)

(72) Inventor: Carl D. Schrubbe, Waukesha, WI (US)

(73) Assignee: Joral LLC, Mukwonago, WI (US)

( * ) Notice: Subject to any disclaimer, the term of this patent is extended or adjusted under 35 U.S.C. 154(b) by 481 days.

(21) Appl. No.: 15/795,868

(22) Filed: Oct. 27, 2017

(65) Prior Publication Data

US 2018/0051973 A1 Feb. 22, 2018

Related U.S. Application Data

(63) Continuation-in-part of application No. 14/636,169, filed on Mar. 2, 2015, now Pat. No. 9,803,998.

(Continued)

(51) Int. Cl.
   *G01B 7/00* (2006.01)
   *G01D 5/14* (2006.01)
   *G01P 3/481* (2006.01)

(52) U.S. Cl.
   CPC ............. *G01B 7/003* (2013.01); *G01D 5/145* (2013.01); *G01P 3/4815* (2013.01)

(58) Field of Classification Search
   CPC ...... G01D 5/142; G01R 15/20; G01R 15/202; G01R 21/08; G01R 33/06; G01R 33/07;
   (Continued)

(56) References Cited

U.S. PATENT DOCUMENTS 3,780,313 A 12/1973 Wiegand
3,820,090 A 6/1974 Wiegand
(Continued)

FOREIGN PATENT DOCUMENTS

AU 2004100358 6/2004
CA 2774702 10/2012
(Continued)

OTHER PUBLICATIONS

Tulk, Jim, Innovative Encoders for Demanding Applications, Posital—Fraba, Mar. 13, 2009.
(Continued)

*Primary Examiner* — Tung X Nguyen
(74) *Attorney, Agent, or Firm* — Boyle Fredrickson S.C.

(57) ABSTRACT

A position sensor is configured to use a Wiegand wire, position magnet(s) and a reset magnet in which changes in polarization of the Wiegand wire caused by the position magnet(s) can be reset by the reset magnet. The position magnet(s), which can move in relation to the Wiegand wire, can have relatively stronger magnetic flux densities, and the reset magnet, which can be fixed in relation to the Wiegand wire, can have a relatively weaker magnetic flux density. When the position magnet(s) are proximal the Wiegand wire, the relatively stronger position magnet(s) overcome the reset magnet to cause a change in polarization of the Wiegand wire which produces an electrical pulse which can be counted. However, when the position magnet(s) become distal to the Wiegand wire, the relatively weaker reset magnet can reset the polarization of the Wiegand wire to prepare for a next count. As a result, the total number of magnets required in the system can be reduced, and the probability of failing to reset the Wiegand wire can be lowered.

32 Claims, 4 Drawing Sheets

Related U.S. Application Data

Figure 1A:
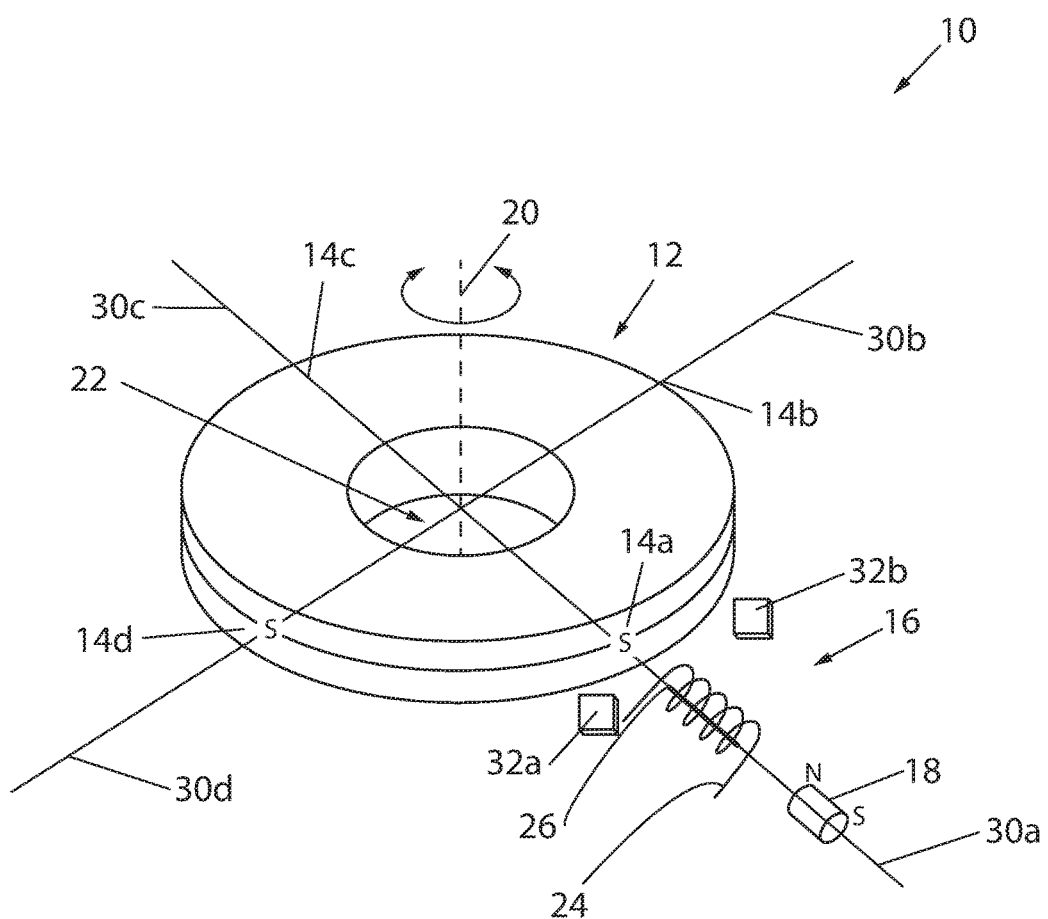

(60) Provisional application No. 61/922,563, filed on Dec. 31, 2013, provisional application No. 62/127,087, filed on Mar. 2, 2015, provisional application No. 62/521,855, filed on Jun. 19, 2017.

(58) Field of Classification Search
CPC ........ G01R 33/077; G01R 33/02; G01B 7/30; G01B 7/14; G01B 7/00
See application file for complete search history.

(56) References Cited

U.S. PATENT DOCUMENTS

| | | |
|---|---|---|
| 3,892,118 A | 7/1975 | Wiegand |
| 4,150,314 A | 4/1979 | Zabler et al. |
| 4,157,482 A | 6/1979 | Kakinuma |
| 4,247,601 A | 1/1981 | Wiegand |
| 4,263,523 A | 4/1981 | Wiegand |
| 4,309,628 A | 1/1982 | Wiegand |
| 4,503,391 A | 3/1985 | Hinke |
| 4,579,008 A | 4/1986 | Bohm et al. |
| 4,639,670 A | 1/1987 | Normann et al. |
| 5,057,727 A | 10/1991 | Jones |
| 5,663,641 A * | 9/1997 | Morita ................ G01P 3/4815 324/174 |
| 5,898,241 A | 4/1999 | Ganderillas |
| 6,097,183 A | 8/2000 | Goetz et al. |
| 6,163,746 A | 12/2000 | Moerbe et al. |
| 6,229,300 B1 | 5/2001 | Dlugos |
| 6,466,011 B1 | 10/2002 | Imanaka |
| 7,025,328 B2 | 4/2006 | Ulicny et al. |
| 7,908,762 B2 | 3/2011 | Siraky |
| 8,111,065 B2 | 2/2012 | Mehnert et al. |
| 8,283,914 B2 | 10/2012 | Mehnert et al. |
| 8,294,457 B2 | 10/2012 | Schrubbe et al. |
| 8,327,553 B2 | 12/2012 | Matzker et al. |
| 8,655,615 B2 | 2/2014 | Mehnert et al. |
| 8,766,625 B2 | 7/2014 | Mehnert et al. |
| 9,018,943 B2 | 4/2015 | Schrubbe |
| 9,374,948 B2 | 6/2016 | Schrubbe et al. |
| 9,528,856 B2 | 12/2016 | Gehringer et al. |
| 2003/0094945 A1 | 5/2003 | Netzer et al. |
| 2008/0180864 A1 | 7/2008 | Meguro et al. |
| 2009/0167713 A1 | 7/2009 | Edwards et al. |
| 2010/0213927 A1* | 8/2010 | Mehnert ................ G01D 5/145 324/207.2 |
| 2011/0006757 A1* | 1/2011 | Mehnert ................ G01P 3/4815 324/207.2 |
| 2011/0184691 A1 | 7/2011 | Mehnert et al. |
| 2012/0268109 A1 | 10/2012 | Mehnert et al. |

FOREIGN PATENT DOCUMENTS

| | | |
|---|---|---|
| DE | 3219491 | 12/1983 |
| DE | 3302084 | 7/1984 |
| DE | 102005006419 | 12/2005 |
| DE | 102005009489 | 8/2006 |
| DE | 102005035571 | 2/2007 |
| DE | 102010010239 | 9/2011 |
| EP | 0484716 | 5/1992 |
| GB | 2050627 | 1/1981 |
| GB | 1590368 | 6/1981 |
| GB | 2071336 | 9/1987 |
| WO | 9954685 | 10/1999 |

OTHER PUBLICATIONS

White Paper, Re-Inventing the Rotary Encoder: The No-Compromise IXARC from Posital, Posital—Fraba.

* cited by examiner

POSITION SENSOR WITH WIEGAND WIRE, POSITION MAGNET(S) AND RESET MAGNET

CROSS-REFERENCE

This application claims all benefits to and priority in U.S. Provisional Application Ser. No. 62/521,855, filed on Jun. 19, 2017, and this application is a continuation in part of U.S. Non-Provisional application Ser. No. 14/636,169, filed on Mar. 2, 2015, now U.S. Pat. No. 9,803,998, issued Oct. 31, 2017, which claims all benefits to and priority in U.S. Provisional Application Ser. No. 61/922,563, filed on Dec. 31, 2013, U.S. Provisional Application Ser. No. 62/127,087, filed on Mar. 2, 2015, the entirety of each of which is hereby expressly incorporated by reference herein.

FIELD

The present invention relates generally to position sensors including linear and rotary position sensors, and more particularly to a position sensor having a Wiegand wire, position magnet(s) and a reset magnet in which changes in polarization of the Wiegand wire caused by the position magnet(s) can be reset by the reset magnet.

BACKGROUND

Many attempts have been made to measure position using linear and rotary position measurement devices that employ a wide variety of different types of position sensing systems using different types of position sensing head arrangements, sensing elements, circuits, techniques and methods with varying degrees of success. Many of these position measurement devices have position determining systems equipped with a fine position sensing system used to determine fine position and a coarse position sensing system designed to determine and retain a position state using power generated by the coarse position sensing system during coarse position sensing system operation. Such position measurement devices equipped with coarse position sensing systems configured to at least partially or even completely power the position determining system are expensive, are relatively inflexible in their implementation, and can suffer coarse position determination problems.

More recently, Wiegand wires have been used to improve such position measurement devices. A Wiegand wire is a specially formed wire capable of magnetization with a polarization in a first state when exposed to a magnetic field, and reversal of the polarization in a second state when exposed to a revere of the magnetic field, known as the "Wiegand effect," including as described in U.S. Pat. No. 3,820,090 ("Bistable Magnetic Device"). In such systems, Wiegand wires and magnets can be configured to move relative to one another so that position sensing can be efficiently provided. However, this typically requires a significant number of magnets arranged with alternating poles oriented toward the Wiegand wires so that the Wiegand wires can switch between polarization states with relative movement in order to provide position determination. It is now desirable to improve such position sensing systems to achieve high accuracy while requiring the least amount of resources possible.

SUMMARY

The present invention is directed to a position sensor is configured to use a Wiegand wire, position magnet(s) and a reset magnet in which changes in polarization of the Wiegand wire caused by the position magnet(s) can be reset by the reset magnet. The position magnet(s), which can move in relation to the Wiegand wire, can have relatively stronger magnetic flux densities, and the reset magnet, which can be fixed in relation to the Wiegand wire, can have a relatively weaker magnetic flux density. When the position magnet(s) are proximal the Wiegand wire, the relatively stronger position magnet(s) overcome the reset magnet to cause a change in polarization of the Wiegand wire which produces an electrical pulse which can be counted. However, when the position magnet(s) become distal to the Wiegand wire, the relatively weaker reset magnet can reset the polarization of the Wiegand wire to prepare for a next count. As a result, the total number of magnets required in the system can be reduced. In addition, the probability of failing to reset the Wiegand wire can be lowered. Also, Hall effect sensors can be used for direction determination to provide absolute position sensing.

Specifically then, one aspect of the present invention can provide a position sensor including: a pulse generator including a pick-up coil wound around a can be configured to move with respect to one another. Also, the pulse generator and the reset magnet can be configured to remain stationary with respect to one another. Also, a magnetic flux density of the position magnet can be greater than a magnetic flux density of the reset magnet.

Another aspect of the present invention can provide an absolute position sensor including: a detector including: a pulse generator including a pick-up coil wound around a Wiegand wire; multiple Hall sensors; a reset magnet; and a track carrying multiple position magnets. The detector and the track can be configured to move with respect to one another. Also, the pulse generator and the reset magnet can be configured to remain stationary with respect to one another. Also, magnetic flux densities of the position magnets can be greater than a magnetic flux density of the reset magnet. Also, the detector can be configured to increment or decrement a coarse position counter and resolve a fine position between position magnets using interpolation.

In addition, the invention can include a position sensor that preferably is an absolute position sensor that even more preferably is well suited for use as an absolute linear position sensor. While such a position sensor constructed in accordance with the present invention is capable of "infinite length" use, it should be readily apparent that it is not limited to "infinite length" use. The position sensor has a positional signal emitting arrangement that can be formed of a long line (string) of spaced apart magnets mounted to or otherwise carried by or in a track, or other holder and/or arranged in such a manner using another suitable mounting method. A Detector passes over the track in a continuous fashion. A first detector circuit reads and counts each desired magnet pole as it passes over it, to accumulate the incremental distance between each magnet. The sum of magnet distances is then added to the distance calculated by the second detector circuit which interpolates the magnetic flux strength between the incremental magnets. The length of the magnet track limited only by the number of bytes used to store the incremental data.

In one embodiment, a 64-bit number or result obtained where magnets at ½ inch intervals would theoretically enable measurement of lengths or distances as great as 1.455 EE 14 miles with interpolating to 8 bits of data using a method of interpolation in accordance with that disclosed herein results in fine position determination to within 0.003 inch accuracy. In other words, fine position measurement accuracy is provided with a position sensor constructed in accordance with the present invention that is greater than believed previously done in conventional linear position sensors.

Components of one embodiment of an absolute position sensor equipped with a position determining system having fine position resolution using interpolation in accordance with the present invention include (a) an elongate track containing magnets spaced at even intervals; (b) a detector comprised of two separate measuring elements including (i) digital (on/off) value sensors to detect and count the magnets on an incremental basis providing coarse position, and (ii) analog (scalar) value sensors used in interpolating the position between the incremental magnets providing fine position, and (c) a processor, preferably a central processor, used to (i) sum and store incremental magnet count to provide coarse position and/or coarse motion, and (ii) process and the scalar magnetic flux values to resolve fine position between magnets. The detector is comprised of two parts, the incremental counting unit or subsystem (ICU), which can provide coarse position, and the magnetic (flux) interpolation unit (MIU), which is a fine position resolution subsystem that provides fine position. The position being the detector being the sum of the data contained in the ICU plus the MIU.

In one embodiment, a magnetic flux sensor in accordance with the present invention is provided that outputs a signal, such as a pulse, when triggered by a sensor-triggering magnetic field having a magnetic field strength or flux density greater than a sensor trigger flux density threshold of the sensor that also includes a reset magnetic field having a magnetic field strength or flux density greater than a trigger reset flux density threshold of the sensor that resets the sensor in the absence of a triggering magnetic field of a sufficient magnetic field strength or magnetic flux density. In a preferred magnetic flux sensor, the density of the flux through the sensor sufficient to reset the sensor in order for the sensor to trigger upon the flux density or field strength reaching and preferably exceeding the sensor trigger threshold preferably is a trigger reset magnetic flux density that is at least as great and preferably greater than the sensor trigger flux density. In one such preferred magnetic flux sensor, a source of a trigger reset magnetic field having a magnetic field strength of magnetic flux density at or extending through the sensor is greater than the trigger flux density of the sensor without the presence of any other source of a magnetic field having magnetic flux at or extending through the sensor thereby enabling the sensor to reset so the sensor will output a pulse when the flux of a source of a triggering magnetic field at or extending through the sensor reaches and preferably exceeds the trigger magnetic flux density of the sensor. In a preferred embodiment, the magnetic flux sensor is a pulse sensor that outputs a pulse upon being triggered by the triggering magnetic field of a trigger magnetic field source of one polarity with the pulse sensor being reset for being triggered again by the trigger resetting magnetic field of a trigger resetting magnetic field source of an opposite polarity preferably once the triggering magnetic field subsides to a sufficiently low enough flux density to trigger the pulse sensor.

In a preferred embodiment, the magnetic flux sensor employs a Wiegand wire carrying a pulse coil with the pulse coil generally coaxial with and telescoped over the Wiegand wire forming a Wiegand wire pulse sensor. A trigger-resettable Wiegand wire pulse sensor in accordance with the present invention further includes a Wiegand wire resetting magnetic field from a source of a magnetic field having a polarity or pole facing generally towards the Wiegand wire that is opposite a Wiegand wire triggering magnetic field from a source of a magnetic field having a polarity or pole also facing generally towards the Wiegand wire but disposed a distance from the Wiegand wire resetting magnetic field such that the Wiegand wire is interposed therebetween. Such a trigger-resettable Wiegand wire pulse sensor, more preferably trigger wire resettable Wiegand wire pulse sensor, employs one source of a magnetic field used to reset the Wiegand wire that can be and which preferably is a steady state magnetic field source, preferably a permanent magnet, which is or provides a trigger reset magnetic field having a pole or polarity opposite another source of a magnetic field used to trigger the Wiegand wire into causing an electrical pulse of current to be outputted from the pulse coil that can be and which preferably is a steady state magnetic field source, preferably another permanent magnet, which is or provides a trigger magnetic field having a magnetic field strength or magnetic flux density greater than that of the trigger reset magnetic field. In a preferred embodiment, the strength of the magnetic field or density of the magnetic flux of the triggering magnetic field, from triggering magnetic field source, preferably triggering steady state magnetic field source, more preferably from permanent trigger magnet, extending through or magnetically coupled with the Wiegand wire of the trigger-resettable pulse sensor is sufficiently greater than the strength of the magnetic field or density of the magnetic flux of the repulsive opposite polarity trigger resetting magnetic field, to trigger the Wiegand wire and cause the pulse coil to output an electrical current pulse. In one such preferred embodiment, the strength of the magnetic field or density of the magnetic flux of the triggering magnetic field source, preferably steady state triggering magnetic field source, more preferably permanent trigger magnet, extending through or magnetically coupled with the Wiegand wire is at least a plurality of times, preferably at least a plurality of pairs of, i.e., at least three, times greater than the opposite polarity strength of the magnetic field or density of the magnetic flux of the repulsive trigger resetting magnetic field, preferably from trigger resetting steady state magnetic field source, more preferably from trigger-resetting permanent magnet.

In a preferred trigger resettable Wiegand wire pulse sensor, the Wiegand wire, pulse coil and source of the trigger-resetting magnetic field, preferably steady-state magnetic field source, more preferably trigger-resetting permanent magnet, are formed as a unit, preferably a sensor unit of one-piece and unitary construction that can be and which preferably is plug-and-play or printed circuit board surface mounted electrical component. If desired, such a trigger-resettable Wiegand wire pulse sensor can come in the form of a kit or assembly with at least one, preferably at least a plurality, and more preferably at least a plurality of pairs, i.e., at least three, of stronger magnetic field strength or stronger magnetic flux opposite pole or opposite polarity trigger magnets. Permanent magnets suitable for use as trigger magnets and trigger-reset magnets include magnets rare earth Alnico (AlNiCo), samarium cobalt (SmCo5), or neodymium (NdFeB) magnets. In at least one preferred embodiment, the trigger reset magnet of each trigger-resettable Wiegand wire pulse sensor constructed in accordance with the present invention has a magnetic field strength, flux density, or gauss of no more than 300 gauss, preferably of no more than 250 gauss, and more preferably of no more than about 200 gauss±25 gauss, and each trigger magnet used with such a trigger-resettable Wiegand wire pulse sensor has a magnetic field strength, flux density, or gauss of at least 900 gauss, preferably of at least 950 gauss, and more preferably of at least about 1000 gauss±100 gauss. Such a trigger-resettable Wiegand wire pulse sensor can be in the form of a surface mounted or surface mountable electrical component or circuit, such as an integrated circuit, preferably being in the form of a single inline package (SIP), dual inline package (DIP) quadruple inline package (QIP), zig-zag inline package (ZIP), a molded DIP (MDIP), or plastic DIP (PDIP), that includes at least one Wiegand wire, pulse coil coaxially carried by the Wiegand wire, e.g., a coil of wire helically wrapped around the Wiegand wire substantially the length of the Wiegand wire, and the trigger-reset magnet all of which can be molded or otherwise formed into one of the aforementioned electronic package formats having a plurality of electrical leads or outputs which can be soldered or solder mounted, e.g., surface mounted, to a printed circuit board (PCB). If desired, such a trigger-resettable Wiegand wire pulse sensor in accordance with the present invention can further include an onboard processor, such as a microcontroller, configured with firmware, that is in electrical cooperation, e.g., electrically connected, to one of the Wiegand wire and pulse coil. If desired, such a trigger-resettable Wiegand wire pulse sensor in accordance with the present invention can further include one or a plurality of spaced apart Hall sensors, which also can be in electrical cooperation with the processor, with the firmware configured to process signals from each Hall sensor and the pulse coil.

DRAWING DESCRIPTION

Figure 1B:
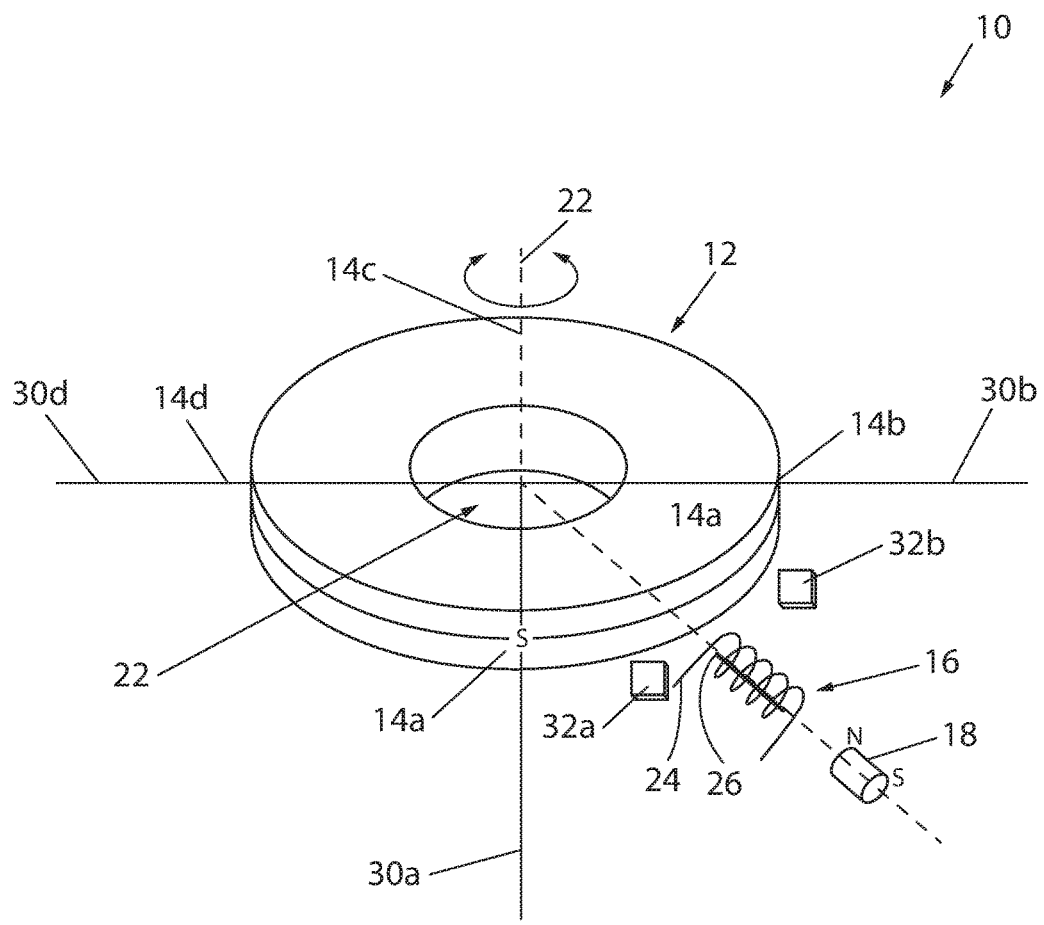
Figure 2:
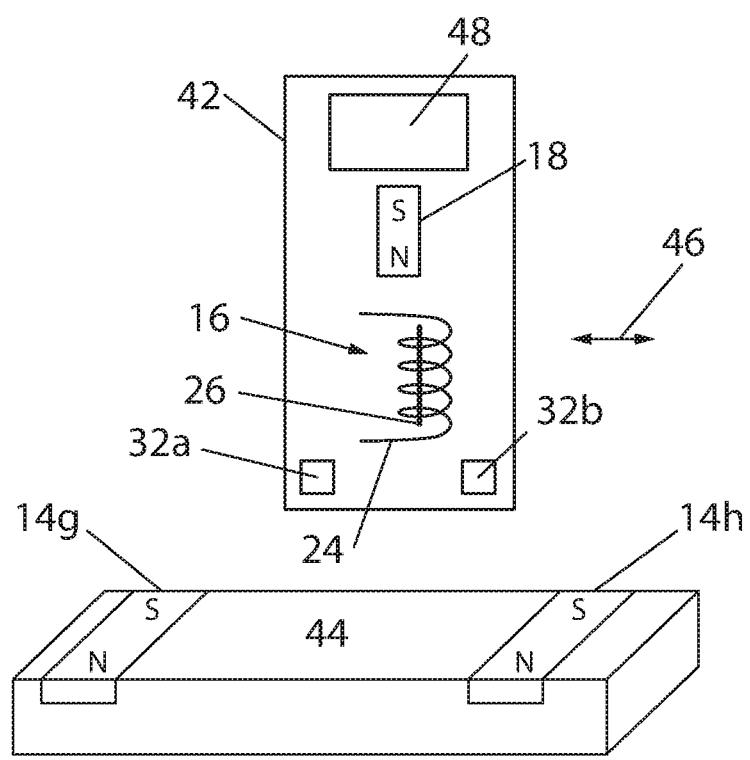
Figure 3:
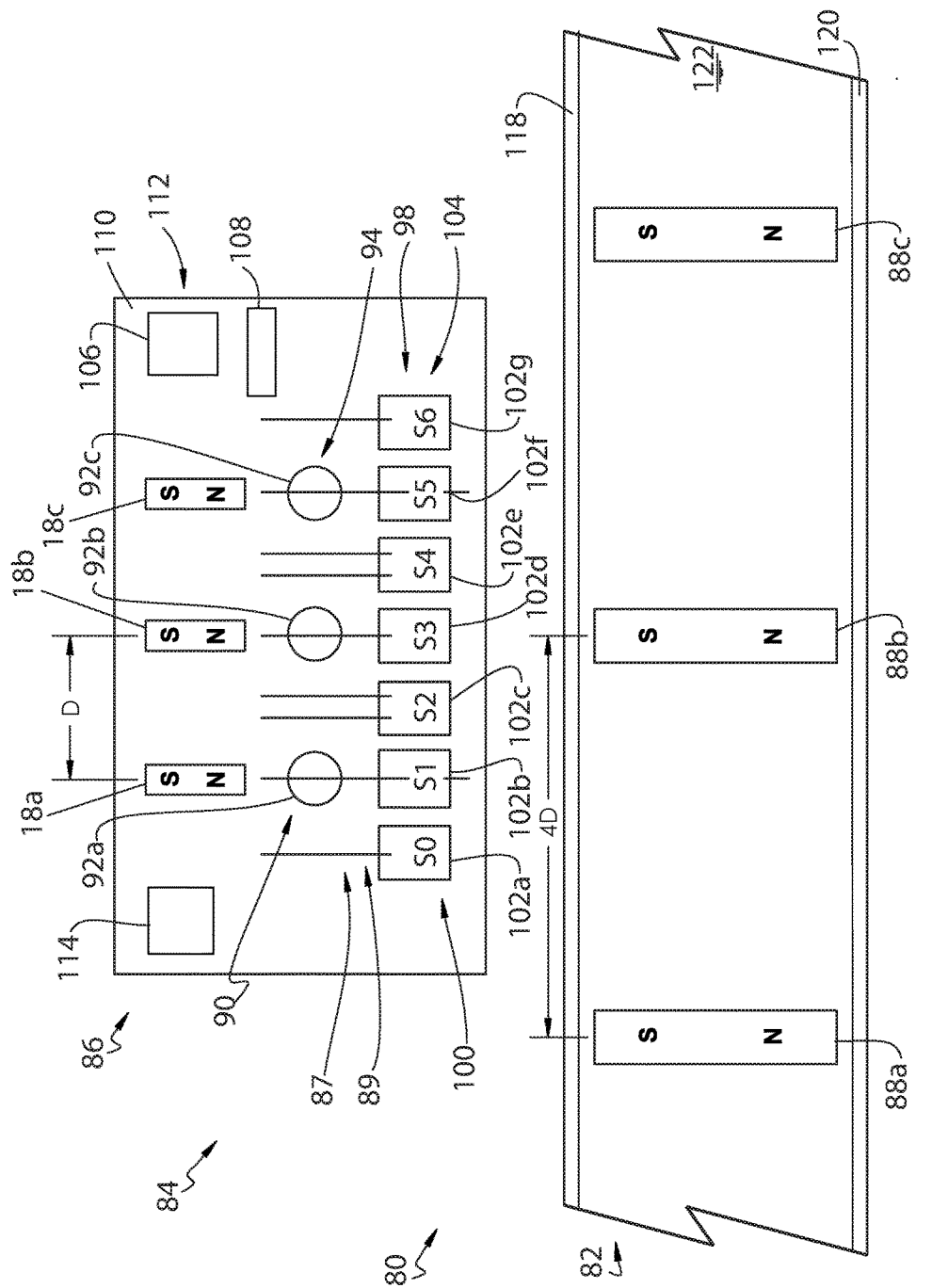

One or more preferred exemplary embodiments of the invention are illustrated in the accompanying drawings in which like reference numerals represent like parts throughout and in which:

FIGS. 1A and 1B are diagrammatic perspective views of a simplified position sensing system in first and second states, respectively, in which a relatively stronger position magnet causes a change in polarization of a Wiegand wire in the first state, and a relatively weaker reset magnet resets the polarization of the Wiegand wire in the second state, in accordance with an aspect of the invention;

FIG. 2 is a diagrammatic perspective view of a simplified position sensing system having a Wiegand wire, relatively stronger position magnet(s) and a relatively weaker reset magnet, in which a detector, including the Wiegand wire and the reset magnet, and a linear segment of a track, including the position magnet(s), are configured to move relative to one another, in accordance with an aspect of the invention; and FIG. 3 is a schematic view of an embodiment of a high resolution absolute position sensing system constructed using Wiegand wires, relatively stronger position magnets and relatively weaker reset magnets, in accordance with an aspect of the invention.

Before explaining one or more embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Referring now to FIGS. 1A and 1B, diagrammatic perspective views of a simplified position sensor 10 in a first state (FIG. 1A) and in a second state (FIG. 1B) are provided in accordance with an aspect of the invention. The position sensor 10 can include a track 12 carrying one or more position magnets 14 (shown as position magnets 14a, 14b, 14c and 14d), a pulse generator 16 positioned in proximity to the track 12, and a reset magnet 18 positioned in proximity to the pulse generator 16.

The track 12 can be configured to carry the one or more position magnets 14 according to various arrangements. In one aspect, as shown in FIGS. 1A and 1B, the track 12 can be an annular disk or ring configured to rotate clockwise and/or counter-clockwise with respect to an axis of rotation 20. The disk can include an aperture 22 centered with respect to the disk and the axis of rotation 20 for mounting to a rotating shaft (not shown) in a system as desired for position sensing. The track 12 can also include various numbers of position magnets 14, depending on the size of the track 12 and/or sizes of the position magnets 14, and as shown in FIGS. 1A and 1B, includes four identical position magnets 14a, 14b, 14c and 14d, radially spaced 90° apart from one another, on equidistant axes, around a circumferential edge the disk. Each of the position magnets 14 can be configured to have a common pole, such as the North poles ("N") of each position magnet 14, or the South poles ("S") of each position magnet 14 as shown in the figures, oriented toward the pulse generator 16 when a position magnet 14 moves in proximity to the pulse generator 16. In addition, magnetic flux densities of the position magnets 14 are relatively greater than a magnetic flux density of the reset magnet 18. For example, magnetic flux densities of the position magnets 14 could be 1000 Gauss or more, while a magnetic flux density of the reset magnets 18 could be 200 Gauss or less. In alternative aspects, the track 12 can have linear segments and/or remain stationary while the pulse generator 16 moves.

The pulse generator 16 can include a pick-up coil 24 wound around a Wiegand wire 26. A Wiegand wire is a specially formed wire capable of magnetization with a polarization in a first state when exposed to a magnetic field, and reversal of the polarization in a second state when exposed to a revere of the magnetic field, known as the "Wiegand effect," including as described in U.S. Pat. No. 3,820,090 ("Bistable Magnetic Device"). The pick-up coil 24 can be wound around the Wiegand wire 26 to inductively produce an electrical pulse upon such changes of polarization of the Wiegand wire between the first and second states. Such pulses can be detected via pulse processing circuitry, which can include filters, buffers, amplifiers, analog to digital conversions, and the like, and can be counted via a processor, controller, programmable logic, or the like, for continuous position sensing and monitoring.

The pulse generator 16 and the reset magnet 18 can be configured to remain stationary with respect to one another. Moreover, the pulse generator 16 can be configured to remain between the position and reset magnets 14 and 18, respectively. The reset magnet 18 can be configured to have one pole, such as the North pole ("N") of the reset magnet 18 as shown, or the South pole ("S") of the reset magnet 18, oriented toward the pulse generator 16. The one pole of the reset magnet 18 oriented toward the pulse generator 16 can be an opposite pole to the common poles of the position magnets 14 oriented toward the pulse generator 16 when the position magnets 14 are moving in proximity to the pulse generator 16.

Accordingly, as movement occurs between the track 12 and the pulse generator 16, because the magnetic flux densities of the position magnets 14 are greater than the magnetic flux density of the reset magnet 18, the Wiegand wire 26 can alternate between "set" states and "reset" states. Set states can occur when a position magnet 14 is proximal to the Wiegand wire 26, and the Wiegand wire 26 is more influenced by the magnetic field of the position magnet 14, to effect a first state of polarization to the Wiegand wire 26, as shown in FIG. 1A. Reset states can occur when position magnets 14 are distal to the Wiegand wire 26, and the Wiegand wire 26 is no longer influenced by magnetic fields of the position magnets 14, but rather more influenced by the magnetic field of the reset magnets 18, to effect a second state of polarization to the Wiegand wire 26, which is opposite to the first state, as shown in FIG. 1B.

For example, as shown in FIG. 1A, when the South pole of the position magnet 14a is proximal to the pulse generator 16, which can be recognized by an approximate alignment of the position magnet 14a and the pulse generator 16 along a position axis 30a, the position magnet 14a can set the Wiegand wire to the first state of polarization. This, in turn, can inductively produce a pulse in the pick-up coil 24 of the pulse generator 16, which can be detected and counted. However, as shown in FIG. 1B, when the South pole of the position magnet 14a is distal to the pulse generator 16, which can be recognized by an approximate separation of the position magnet 14a and the pulse generator 16, the reset magnet 18 can reset the Wiegand wire to the second state of polarization. This, in turn, can inductively produce a reset pulse in the pick-up coil 24 of the pulse generator 16, which can be detected for ensuring proper operation of the system. Then, as a next position magnet 14 moves proximal to the pulse generator 16, such as the position magnet 14b, the next position magnet 14 can set the Wiegand wire again to the first state of polarization to produce another pulse which can be detected and counted. In this way, counts can be incremented and/or decremented based on relative movement.

In addition, multiple Hall-effect sensors 32 can be configured to detect a direction of movement of the pulse generator with respect to the position magnet. For example, first and second Hall sensors 32a and 32b, respectively, can continuously generate sine and cosine signals, respectively, upon detection of permanent magnets 14, which can be compared for direction determination. Accordingly, the position sensor 10 can be configured for absolute position sensing such that the position sensor 10 in a preferred embodiment is an absolute position sensor.

Referring now to FIG. 2, a diagrammatic perspective view of a simplified position sensor 40 having a position sensing detector 42, and a linear segment 44 of a track, moving with respect to one another along a linear axis 46, is provided in accordance with an aspect of the invention. The detector 42 can include: the pulse generator 16 for position sensing, including the pick-up coil 24 wound around the Wiegand wire 26; multiple Hall-effect sensors 32 for absolute position sensing, including the first and second Hall sensors 32a and 32b, respectively; the reset magnet 18 for resetting the Wiegand wire 26; and a controller 48 in communication with the pulse generator 16 and the Hall-effect sensors 32, with circuitry in between as may be required, such as filters, buffers, amplifiers, analog to digital conversions, and the like. Accordingly, the pulse generator 16 and the reset magnet 18 can remain stationary with respect to one another. Moreover, the pulse generator 16 can remain between the position magnets 14, on a first side the pulse generator 16, and the reset magnet 18, on a second side of the pulse generator 16.

In addition, the linear segment 44 of the track can carry the position magnets 14 such that a common pole, such as the South poles ("S") of each position magnet 14 as shown, is oriented toward the pulse generator 16. Meanwhile, the reset magnet 18 can be configured to have an opposing pole, such as the North pole ("N") of the reset magnet 18 as shown, oriented toward the pulse generator 16. Accordingly, the detector 42 can increment or decrement a coarse position counter, based on sets and resets of the Wiegand wire 26 via the position magnets 14 and the reset magnet 18, respectively. In particular, the controller 48 can increment or decrement the coarse position counter based on pulses produced by the pulse generator 16. In addition, the detector 42 can resolve a fine position between position magnets 14 using interpolation, via the Hall-effect sensors 32. In alternative aspects, multiple pulse generators 16, reset magnets 18 and/or Hall-effect sensors 32 can be provided as desired for even greater accuracy and/or reliability, including as described with respect to FIG. 3.

Referring now to FIG. 3, a schematic view of an embodiment of a high resolution absolute position sensor 80 is provided in accordance with an aspect of the invention. The position sensor 80 can include a positional signal emitting arrangement 82 and a position determining system 84 having a proximity sensing detector 86 that reads signals from spaced apart positional signal emitters 88a, 88b, 88c, and so forth, of the positional signal emitting arrangement 82 during relative movement between the detector 86 and the positional signal emitting arrangement 82 in determining position information pertaining to a change of relative position therebetween. The detector 86 has a counting signal detector 87 or coarse position signal detector 89 that can be in the form of a counting signal detector array 90 that includes one or more counting signal detecting sensors 92, such as counting signal detecting sensors 92a, 92b, 92c, that forms part of an incremental counting subsystem 94 with the counting signal detecting sensors 92a, 92b, 92c used to digitally detect the presence or absence of a signal 96 emitted from an adjacent one of a spaced apart positional signal emitter 88 passes by during relative movement enabling each detected signal 96 to be used in accumulation of an incremental distance traveled. The detector 86 also has reset mechanisms for resetting the counting signal detecting sensors 92a, 92b, 92c between detections of positional signal emitters 88a, 88b, 88c, which reset mechanisms can be reset magnets 18a, 18b, 18c. The detector 86 also has a fine position signal detector 98 that can be in the form of a fine position signal detecting array 100 that includes a plurality of spaced apart fine position signal strength or flux detecting sensors 102a or S0, 102b or S1, 102c or S2, 102d or S3, 102e or S4, 102f or S5, 102g or S6, which forms part of a fine position resolution system 104 with signal strength or flux detecting sensors 102a, 102b, 102c, 102d, 102e, 102f and/or 102g used to measure signal strength between at least one positional signal emitters 88, which is interpolated using a processor 106 onboard the position sensor 80 to relatively precisely determine a position of the detector 86 relative to the positional signal emitting arrangement 82.

In use, the detector 86 is mounted to one part of a machine or apparatus (not shown) that uses position information from the position determining system 84 during machine or apparatus operation and the positional signal emitting arrangement 82 is mounted to another part of the machine or apparatus that moves relative to the one part of the machine or apparatus during machine or apparatus operation. In typical use, the detector 86 is mounted to a fixed or stationary part of the machine or apparatus and the positional signal emitting arrangement 82 is mounted to a movable part of the machine or apparatus that moves relative to the fixed or stationary part of the machine or apparatus during machine or apparatus operation such that the positional signal emitting arrangement 82 moves relative to the detector 86 during machine or apparatus operation. If desired, the positional signal emitting arrangement 82 can be mounted to the fixed or stationary part of the machine or apparatus and the detector 86 can be mounted to the movable part of the machine or apparatus such that the detector 86 moves relative to the positional signal emitting arrangement 82 during machine or apparatus operation.

The position determining system 84 includes at least one processor 106, preferably in the form of a microcontroller, microprocessor, field programmable gate array or the like, which is configured, such as in firmware and/or software, (a) to accumulate counts and/or incremental distance traveled between positional signal emitters as part of the incremental counting subsystem 94, and (b) to perform interpolation as part of the fine position resolution subsystem 95. The firmware and/or software can be stored onboard the processor 106, such as in memory onboard the processor 106, e.g., microcontroller, and/or can be stored in separate memory 108 linked to the processor 106. Processor 106 is disposed onboard the sensor 80 preferably by being disposed onboard the position determining system 84. In one embodiment, the processor 106 is disposed onboard the detector 86 by being mounted on, to or in the detector 86. Where the sensor 80 is equipped with memory 108 separate from the processor 106 and/or in addition to memory onboard the processor 106, e.g., microcontroller, the memory 108 preferably is conventional non-volatile random access memory, such as erasable programmable read only memory (EPROM), electronically erasable programmable read only memory (EEPROM), and/or conventional flash memory, which retains the contents stored in memory even when no electricity or electrical power is present. Where the memory 108 used is in the form of flash memory, e.g. NVRAM, examples of suitable flash memory include floating gate transistor flash memory, NOR flash memory, NAND flash memory, and/or vertical NAND flash memory. Where the sensor 80 is equipped with memory 108 separate from the processor 106 and/or in addition to memory onboard the processor 106, e.g., microcontroller, the memory 108 is disposed onboard the sensor 80 preferably by being disposed onboard the detector 86 by being mounted on, to or in the detector 86. In one embodiment, the processor 106, memory 108, counting signal detecting sensors 92a, 92b, 92c, reset mechanisms, such as the reset magnets 18a, 18b, 18c, and fine position signal strength or flux detecting sensors 102a or S0, 102b or S1, 102c or S2, 102d or S3, 102e or S4, 102f or S5, 102g or S6 are all mounted to the same or common detector board 110, e.g., etched or printed circuit board, which can and preferably does form a position detecting head 112 of the detector 86.

By providing a position sensor 80 in accordance with the present invention having an onboard processor 106 configured in firmware and/or software with (a) a method of determining and/or keeping track of the current coarse position at or between one of the adjacent pairs, i.e., the distance between positional signal emitters 88 by substantially continuously accumulating counts and/or incremental distance traveled between positional signal emitters 88 using one or more and preferably a plurality of the counting signal detecting sensors 92 of the incremental counting subsystem 94, and (b) a method of determining fine position using at least a plurality of the fine position signal strength or flux detecting sensors, 102a or S0, 102b or S1, 102c or S2, 102d or S3, 102e or S4, 102f or S5, and/or 102g or S6, to interpolate a finer position located between the current pair of positional signal emitters 88, determined to be the current coarse position using relative signal or flux strengths of at least a plurality of signals from the current pair of positional signal emitters 88 sensed by the fine position signal strength or flux detecting sensors, 102a or S0, 102b or S1, 102c or S2, 102d or S3, 102e or S4, 102f or S5, and/or 102g or S6.

In one embodiment of an absolute position sensor 80 constructed in accordance with the present invention, the position determining system 84 is configured to operate in a first state that is an unpowered sleep state while no relative movement between the detector 86 and positional signal emitting arrangement 82 takes place while the machine or apparatus is off. The position determining system 84 is further configured to operate in a second state that wakes at least the incremental counting subsystem 94 when relative movement occurs while the machine or apparatus is off having an onboard battery 114 that enables operation of at least the incremental counting subsystem 94 so that any changes in the coarse position of the detector 86 relative to the positional signal emitting arrangement 82 that occur while the machine or apparatus is off are updated using the processor 106 and stored in memory onboard or off-board, e.g., memory 108, the processor 106. Doing so enables at least a coarse position of the detector 86 relative to the positional signal emitting arrangement 82 to be accurately maintained at all times even while the machine or apparatus is not operating, i.e., turned off.

The position determining system 84 of the sensor 80 preferably is even further configured to operate in a third state when the machine or apparatus is turned on by waking or otherwise operating the fine position resolution subsystem 104 to enable fine position information to be determined and provided to the machine or apparatus as needed by the machine or apparatus during machine or apparatus operation. In one embodiment, the fine position resolution subsystem 104 is woken up and operated when electrical power from the machine or apparatus is supplied to the sensor 80, preferably supplied to the position determining system 84, so that fine position information is determined and provided to the machine or apparatus while the machine or apparatus is running or operating.

Such a three stage mode of operation absolute position sensor configuration produces an absolute position sensor 80 constructed in accordance with the present invention that advantageously enables at least coarse position information to be updated while the machine or apparatus is not supplying its electrical power to the sensor 80 by instead drawing sufficient electrical power from its onboard battery 114 to operate the processor 106 and other electrical components 108, 92a, 92b, 92c of at least the incremental counting subsystem 94 when woken up by relative movement when the machine or apparatus is off. This advantageously enables a position sensor 80 in accordance with the present invention to be constructed using less expensive standard electrical components, including an off-the-shelf processor 106, e.g., off-the-shelf microcontrollers, microprocessors, etc., off-the-shelf flash memory 108, and the like which are powered at standard voltages, e.g., at least 2.5 volts and preferably at least volts 3 volts, instead of the more expensive low power controllers and low or zero power memory needed in the past. This also advantageously produces a position sensor 80 in accordance with the present invention that optimizes onboard battery life by only waking up the incremental counting subsystem 94, which requires less power to operate than the fine position resolution subsystem 95 (and which certainly requires less power than needed to operate both the incremental counting subsystem 94 and fine position resolution subsystem 95), and by operating only the incremental counting subsystem 94 using power from onboard battery 114 when relative movement between the detector 86 and positional signal emitting arrangement 82 occurs when the machine or apparatus is off.

With continued reference to FIG. 3, one embodiment of a positional signal emitting arrangement 82 is an elongate substantially straight track 116 in which the plurality of positional signal emitters 88a, 88b, 88c, and so forth, are spaced apart along the track in a predetermined order with a predetermined spacing that enables signals emitted therefrom to be sensed by both (a) the counting signal detecting sensors 92a, 92b, 92c of the coarse position signal detector 89 of the incremental counting subsystem 94, (b) the reset mechanisms for the counting signal detecting sensors 92a, 92b, 92c, such as the reset magnets 18a, 18b, 18c, and (c) the fine position signal strength or flux detecting sensors 102a or S0, 102b or S1, 102c or S2, 102d or S3, 102e or S4, 102f or S5, 102g or S6 of the fine position signal detector 98 of the fine position resolution system 104 during operation. In one embodiment, the track 116 is formed of an elongate extrusion that can be made of plastic, aluminum or another nonmagnetic material having a pair of elongate longitudinally extending generally upraised sidewalls 118, 120 spaced apart by an elongate longitudinally extending recessed sensor seating channel 122 in which the positional signal emitters 88 are fixed. While the positional signal emitters 88 can be directly fixed to the track 116, such as by being potted, fastened, or otherwise attached to the track 116, the positional signal emitters 88 can be pre-mounted to a board (not shown), such as a circuit board or the like, which is in turn directly fixed to the track 116, such as by being potted, fastened, or otherwise secured to the track 116.

In one such embodiment of the positional signal emitting arrangement 82, each one of the positional signal emitters 88 is a magnet having common poles facing outwardly towards any counting signal detecting sensor 92a, 92b, 92c and/or any the fine position signal strength or flux detecting sensor 102a or S0, 102b or S1, 102c or S2, 102d or S3, 102e or S4, 102f or S5, 102g or S6 passing by, e.g., passing over, the magnet with the positional signal emitted from the magnet being a magnetic field of the magnet emanating outwardly towards counting signal detecting sensor 92a, 92b, 92c and/or any the fine position signal strength or flux detecting sensor 102a or S0, 102b or S1, 102c or S2, 102d or S3, 102e or S4, 102f or S5, 102g or S6 passing by, e.g., passing over, the magnet. The positional signal emitting magnets 88 of the positional signal emitting arrangement 82 are arranged with a common magnetic pole of one polarity, e.g., south or "S," oriented outwardly in a sensor-facing position. Meanwhile, the reset mechanisms, such as the reset magnets 18, are arranged with an opposite magnetic pole of one polarity, e.g., north or "N," oriented in a sensor-facing position. The positional signal emitting magnets 88 can have relatively stronger magnetic flux densities than the reset magnets 18. Accordingly, this enables movement direction determination and/or sensor latching or resetting to be done when sensors, such as counting signal detecting sensors 92a, 92b, 92c and/or signal strength or flux detecting sensors 102a or S0, 102b or S1, 102c or S2, 102d or S3, 102e or S4, 102f or S5, 102g or S6 pass by during relative movement.

In one embodiment, the positional signal emitting arrangement 82 is a positional signal emitting track 116 that includes positional signal emitters 88 that are magnets substantially equidistantly spaced apart from one another. Positional signal emitters 88 that are magnets have suffi-ciently strong or large enough magnetic field, e.g., sufficiently large magnetic flux magnitude, to be sensed by counting signal detecting sensors 92a, 92b, 92c and/or signal strength or flux detecting sensors 102a or S0, 102b or S1, 102c or S2, 102d or S3, 102e or S4, 102f or S5, 102g or S6 passing by in close proximity thereto during relative movement during machine or apparatus operation, and to overcome the reset magnets 18. Magnets suitable for use include magnets rare earth Alnico (AlNiCo), samarium cobalt (SmCo5), or neodymium (NdFeB) magnets. It is contemplated that such positional signal emitting magnets 88 can be round, disc-shaped, generally cylindrical, square and/or generally rectangular, e.g. cubic, in shape.

Where magnets are used as positional signal emitters 88 of a positional signal emitting arrangement 82, e.g., magnet carrying track 116, and used for the reset mechanisms, the counting signal detecting sensors 92a, 92b, 92c of the course position signal detector 89 are magnetic field responsive sensors and the fine position signal strength or flux detecting sensors 102a or S0, 102b or S1, 102c or S2, 102d or S3, 102e or S4, 102f or S5, 102g or S6 preferably are also magnetic field responsive sensors. The counting signal detecting sensors 92a, 92b, 92c preferably are digital value outputting magnetic field responsive sensors that output a digital signal, pulse or count only when a magnetic field or flux of sufficient magnitude or intensity, e.g. greater than a magnetic field or flux threshold, is detected. In one embodiment, each one of the counting signal detecting sensors 92a, 92b, 92c is a Wiegand wire but can be another suitable type of digital value outputting magnetic field responsive sensor, such as a reed relay, digital hall switch or another type of sensor digitally responsive to a magnetic trigger. As discussed in more detail below, the fine position signal strength or flux detecting sensors 102a or S0, 102b or S1, 102c or S2, 102d or S3, 102e or S4, 102f or S5, 102g or S6 are magnetic field or flux strength responsive sensors outputting an analog signal whose signal magnitude relates, e.g., is proportional, to the strength of the magnetic field or flux detected by the sensor as long as a magnetic field or flux of sufficient strength is detected. In one embodiment, each one of the fine position signal strength or flux detecting sensors 102a or S0, 102b or S1, 102c or S2, 102d or S3, 102e or S4, 102f or S5, 102g or S6 is a hall sensor.

The position sensor 80 preferably is an absolute position sensor that even more preferably is an absolute linear position sensor. While such a position sensor constructed in accordance with the present invention is capable of "infinite length" use, it should be readily apparent that it is not limited to "infinite length" use. The position sensor 80 has a positional signal emitting arrangement 82 that can be formed of a long line (string) of spaced apart magnets mounted to or otherwise carried by or in a track 116, or other holder and/or arranged in such a manner using another suitable mounting method. During operation, a detector 89 passes over the track 116 in a continuous fashion during relative movement therebetween. A first detector circuit reads and counts each desired magnet pole on the track as it passes over it, to accumulate the incremental distance between each magnet, with the resets occurring via the reset mechanisms in between each magnet pole. The sum of magnet distances is then added to the distance calculated by the second detector circuit which interpolates the magnetic flux strength between the incremental magnets on the track. The length of the magnet track is limited only by the number of bytes used to store the incremental data.

In one embodiment, a 64 bit number or result obtained where magnets at ½ inch intervals would theoretically enable measurement of lengths or distances as great as 1.455 EE 14 miles with interpolating to 8 bits of data using a method of interpolation in accordance with that disclosed herein results in fine position determination to within 0.003 inch accuracy. In other words, fine position measurement accuracy is provided with a position sensor constructed in accordance with the present invention that is greater than believed previously done in conventional linear position sensors.

Components of one embodiment of an absolute position sensor equipped with a position determining system having fine position resolution using interpolation in accordance with the present invention include (a) an elongate track 116 containing magnets spaced at even intervals; (b) a detector comprised of two separate measuring elements including (i) digital (on/off) value sensors to detect and count the magnets on an incremental basis providing coarse position, and (ii) analog (scalar) value sensors used in interpolating the position between the incremental magnets providing fine position, (c) reset mechanisms for resetting the digital (on/off) value sensors in between the magnets, and (d) a processor 106, preferably a central processor, used to (i) sum and store incremental magnet count to provide coarse position and/or coarse motion, and (ii) process and the scalar magnetic flux values to resolve fine position between magnets. The Detector can be comprised of two parts, the incremental counting unit or subsystem 94 (ICU), which provides coarse position, and the magnetic (flux) interpolation unit (MIU) 95, which is a fine position resolution subsystem that provides fine position. The position being the sum of the data contained in the ICU plus the MIU, including as described in co-pending U.S. Non-Provisional application Ser. No. 14/636,169 to the same inventor named herein.

The incremental counting unit subsystem counts the magnet poles of the positional signal emitters 88 in the Track or holder as the Detector passed over them, with resets occurring via reset magnets 18 in between. The Track magnets can be encountered as a continuous stream, devoid of gaps or inconsistency. The detector can be composed of many various forms of magnetic signaling devices, or multiple forms of signaling device. Devices known to the profession include, digital hall switches, reed relays, Wiegand Wires, or any device known or unknown which responds to a magnetic trigger. The only necessary factor for a detector sensor is that as the Detector sensor passes over the string of magnets on the track 116, the sensors must detect the presence of the magnetic flux of magnets on the track, to signal the next increment of motion, with a reset of the sensors occurring in between detections to prepare for next detections. The Sensors in the ICU may be arranged in such a manner as to detect direction of motion.

A non-continuous track may be assembled by implementing a sync device, such as a limit switch, bar code reader, analog Hall sensor, or any manor of device known or unknown to the industry which could be used to signal the resumption of counting by triggering a preset count in the ICU or its host device, at the end of the discontinuity of the magnet track. Thus, a very great distance may be composed or otherwise formed of several short sections of track for positioning in several finite spaces with long gaps between the measuring areas.

The MIU is a fine position resolution subsystem that detects and processes the varying magnetic field(s) between the (incremental) magnet poles on the track. The MIU senses and measures the field strength between any two adjacent magnet poles on the track near the MIU. The scalar value of the field strength decreases as the distance from the magnet pole increases. The MIU is composed of one or more flux sensors, disposed by a fixed distance, less than the distance between the counting magnets. MIU Flux sensors, must return a value independent of Z axis separation as changes in flux values due to Z axis separation would be interpreted as translation information, and thus be a cause for error. MIU sensors must also calculate position without absolute lower and upper boundaries to the flux value data. Due to the large number of magnets in the track, and the natural variability of the flux density in any and each individual magnet, a relationship between absolute value of the flux density between two adjacent magnets and the position between magnet poles cannot be guaranteed. Thus the MIU cannot work with absolute values, but must work with relative values. The MIU accomplishes this by placing a magnet flux sensor on either side of the ICU magnetic signaling device. Thus, the MIU detects and compares a RATIO of the values from two MIU sensors. When the values are equal, the MIU detectors are equidistant from the ICU incremental magnet. And the ICU detector is directly above the counting magnet, i.e., a 'ZERO' position. As the MIU sensors translate, the RATIO of the values predicts the position between the two ICU magnets. The greater value indicating the direction of travel. The value calculated by the MIU is then added to the value summed by the ICU to obtain the gross and fine sensor position on the TRACK or magnet string.

In one preferred embodiment, a magnetic flux sensor in accordance with the present invention is provided that outputs a signal, such as a pulse of electrical current, preferably a signal or pulse having at least 200 milliamps and/or having a voltage of at least 200 millivolts, when triggered by a sensor-triggering magnetic field having a magnetic field strength or flux density greater than a sensor trigger flux density threshold of the sensor that also is configured with a magnetically triggerable reset that resets when subjected to a magnetic field of opposite polarity having a magnetic field strength or flux density greater than a trigger reset flux density threshold of the sensor that resets the sensor when subjected to a sensor trigger resetting magnetic field having a magnetic field strength or magnetic flux density reaching and preferably exceeding at least the trigger reset flux density of the sensor. In a preferred sensor embodiment, the sensor trigger reset magnetic field is provided by a magnetic field source onboard the sensor, e.g., formed with or as part of a unit of or designated as the sensor, which preferably is a source of a steady state magnetic field, which can be an electromagnet, but which preferably is a permanent magnet. Such a sensor can be in the form of a sensor assembly or sensor kit that includes at least one, preferably at least a plurality, and more preferably at least a plurality of pairs, i.e., at least three, sources of a sensor triggering magnetic field separate and apart the sensor or sensor unit, which are positionable at one or more different locations spaced or disposed away from the sensor or sensor unit with such an assembly or kit being able to function as a counter, position measurement device, rotation counter, angle measurement device, or distance calculator. If desired, such a sensor unit can include at least a plurality of Hall sensors spaced apart from one another, such as disposed alongside on opposite sides of the magnetic flux sensor, along with a controller, preferably processor, such as a microcontroller, configured in software or preferably firmware to use at least the signals or pulses outputted by the magnetic flux sensor in incrementing or decrementing a counter, measuring a position, obtaining an angle or determining another measurement, property or characteristic. If desired, such a controller can be configured to operate the trigger-resetting magnetic field where provided in the form of a sensor trigger resetting electromagnet.

In a preferred embodiment, the source of the trigger magnetic field has a magnetic field strength or magnetic flux density sufficiently greater than the magnetic field strength or magnetic flux density of the opposite polarity repulsing trigger resetting magnetic field that the trigger magnetic field is able to repulse the trigger resetting magnetic field with a great enough magnetic field strength or magnetic flux density coupling or passing through the magnetic flux sensor to trigger the sensor and output an electrical pulse therefrom. Where or when the magnetic field strength or magnetic flux density of the trigger magnetic field falls below a threshold where sensor trigger coupling no longer occurs, such as where the sensor trigger resetting magnetic field is strong enough or has a flux density great enough to repel the sensor trigger magnetic field away from the magnetic flux sensor, e.g. magnetically decouple the sensor trigger magnetic field from the magnetic flux sensor, triggering of the magnetic flux sensor can no longer occur. When the strength or flux density of the sensor trigger magnet falls low enough or substantially completely subsides, such as due to increased relative movement or increased distance between the sensor or trigger magnetic field, the trigger resetting magnetic field resets the magnetic flux sensor enabling another trigger magnetic field having an opposite pole or polarity to that of the trigger resetting magnetic field can once again trigger the magnetic flux sensor into outputting a pulse of electricity therefrom.

In a preferred magnetic flux sensor, the density of the flux through the sensor sufficient to reset the sensor in order for the sensor to trigger upon the flux density or field strength reaching and preferably exceeding the sensor trigger threshold preferably is a minimum trigger reset magnetic flux density that is at least as great and preferably greater than the sensor trigger flux density. In one such preferred magnetic flux sensor, a source of a trigger reset magnetic field having a magnetic field strength or magnetic flux density coupling with or extending through the sensor is greater than the trigger flux density threshold of the sensor without the presence of any other source of a magnetic field having magnetic flux coupling with or extending through the sensor thereby enabling the sensor to reset so the sensor will output a pulse when the flux of a source of a triggering magnetic field coupling with or extending through the sensor reaches and preferably exceeds the trigger magnetic flux density threshold of the sensor. In a preferred embodiment, the magnetic flux sensor is a pulse sensor that outputs a signal that is a pulse of electrical current having a voltage of at least 200 millivolts, preferably at least 400 millivolts, upon being triggered by the triggering magnetic field of a trigger magnetic field source of one polarity with the pulse sensor being reset for being triggered again by the trigger resetting magnetic field of a trigger resetting magnetic field source of an opposite polarity preferably once the triggering magnetic field subsides to a sufficiently low enough flux density to reset the pulse sensor.

In one preferred embodiment, the magnetic flux sensor employs a Wiegand wire carrying a pulse coil with the pulse coil generally coaxial with and/or telescoped over, e.g., wrapped around, the Wiegand wire forming a Wiegand wire pulse sensor. The Wiegand wire can be constructed in accordance with U.S. Pat. No. 3,820,090 entitled "Bistable Magnetic Device" the entirety of which is expressly incorporated by reference herein. A Wiegand wire pulse sensor suitable for use with a trigger resetting magnetic field, e.g., from a trigger-resetting magnetic field source, such as a steady state trigger-resetting magnetic field source, which preferably can be a trigger-reset magnet of opposite polarity, can be constructed in accordance with U.S. Pat. No. 4,309,628 entitled "Pulse Generation by Changing Magnetic Field" the entirety of which is expressly incorporated by reference herein. A trigger-resettable Wiegand wire pulse sensor in accordance with the present invention further includes a Wiegand wire resetting magnetic field from a source of a magnetic field having a polarity or pole facing generally towards the Wiegand wire and Wiegand wire pulse sensor that is opposite a Wiegand wire pulse sensor triggering magnetic field from a source of a magnetic field having a polarity or pole also facing generally towards the Wiegand wire and Wiegand wire pulse sensor but disposed a distance from the Wiegand wire resetting magnetic field such that the Wiegand wire and preferably also the Wiegand wire pulse sensor is interposed therebetween. Such a trigger-resettable Wiegand wire pulse sensor, more preferably Wiegand wire resettable Wiegand wire pulse sensor, employs one source of a magnetic field used to reset the Wiegand wire that can be and which preferably is a steady state magnetic field source, such as a permanent magnet, which is or provides a Wiegand wire trigger resetting magnetic field having a pole or polarity opposite another source of a magnetic field used to trigger the Wiegand wire pulse sensor into causing an electrical pulse of current to be outputted from the pulse coil coaxially wrapped around or about the Wiegand wire that can be and which preferably is a steady state magnetic field source, such as another permanent magnet, which is or provides a trigger magnetic field having a magnetic field strength or magnetic flux density greater than that of the trigger reset magnetic field or trigger reset magnetic field source. In a preferred embodiment, the strength of the magnetic field or density of the magnetic flux of the triggering magnetic field, from triggering magnetic field source, preferably triggering steady state magnetic field source, more preferably from permanent trigger magnet, extending through or magnetically coupled with the Wiegand wire of the trigger-resettable pulse sensor is sufficiently greater than the strength of the magnetic field or density of the magnetic flux of the repulsive opposite polarity trigger resetting magnetic field or trigger resetting magnetic field source, to trigger the Wiegand wire and cause the pulse coil to output an electrical current pulse. In one such preferred embodiment, the strength of the magnetic field or density of the magnetic flux of the triggering magnetic field source, preferably steady state triggering magnetic field source, more preferably permanent trigger magnet, extending through or magnetically coupled with the Wiegand wire is at least a plurality of times, preferably at least a plurality of pairs of, i.e., at least three, times greater than the strength of the magnetic field or density of the magnetic flux of the repulsive opposite polarity trigger resetting magnetic field, e.g., Wiegand wire resetting magnetic field, preferably provided by a trigger resetting steady state magnetic field source, more preferably provided by a trigger-resetting permanent magnet.

In a preferred trigger resettable Wiegand wire pulse sensor of the present invention, the Wiegand wire, pulse coil, and source of the Wiegand wire trigger resetting magnetic field, e.g., steady-state trigger-resetting magnetic field source, more preferably trigger-resetting permanent magnet, which are or function as a Wiegand wire reset or Wiegand wire resetting magnetic field source, are all formed as a unit, preferably a pulse sensor unit of one-piece and unitary construction that can be and which preferably is plug-and-play or printed circuit board mounted, e.g., surface mount, electrical component. In one preferred embodiment, a Wiegand wire pulse sensor unit has a sensor unit housing or body containing (a) an elongate Wiegand wire, (b) an elongate pulse coil helically wrapped around the Wiegand wire, and (c) a source of a Wiegand wire resetting magnetic field, such as in the form of a permanent magnet, e.g., rare earth magnet. In one such preferred embodiment, one pole of the Wiegand wire resetting magnetic field source, e.g., permanent magnet, is disposed adjacent to and faces toward the Wiegand wire and pulse coil of the trigger-resettable pulse sensor unit with the magnetic flux lines emanating from the wire and coil facing pole of the Wiegand wire resetting magnetic field source being generally transverse or generally orthogonal to the lengthwise or longitudinal extent of the Wiegand wire and pulse coil. In use or installation, an opposite pole of at least one Wiegand pulse sensor trigger magnetic field source, e.g., permanent magnet, is disposed adjacent and/or facing toward the Wiegand wire and pulse coil on a side opposite that of the Wiegand wire resetting magnetic field source with the opposite polarity magnetic flux lines emanating from the wire and coil facing opposite pole of the Wiegand wire pulse sensor triggering magnetic field source being generally transverse or generally orthogonal to the lengthwise or longitudinal extent of the Wiegand wire and pulse coil. Various relative positions and orientations of the Wiegand pulse sensor trigger magnetic field source and Wiegand wire resetting magnetic field source relative to the Wiegand wire and/or Wiegand wire pulse sensor, e.g., Wiegand wire with pulse coil wrapped around the Wiegand wire, are defined in one or more of the claims set forth below.

In operation, relative movement between the Wiegand wire pulse sensor triggering magnetic field source and the Wiegand wire pulse sensor as they get closer together causes the strength and/or flux density of a pulse sensor triggering magnetic field in the vicinity of the Wiegand wire to increase to a great enough strength or density that it repulses the field or flux of the Wiegand wire resetting magnetic field from the Wiegand wire resetting magnetic field source until the strength of the triggering magnetic field or density of the flux lines coupling with or extending through the Wiegand wire reach and preferably exceed the magnetic field strength or magnetic flux density triggering threshold triggering the Wiegand wire and causing an electrical pulse to be generated in and output from the pulse coil to a pair of outputs or electrical leads of the pulse sensor. Relative movement between the Wiegand wire pulse sensor triggering magnetic field source and the Wiegand wire pulse sensor as they get farther away from one another causes the strength and/or flux density of the pulse sensor triggering magnetic field in the vicinity of the Wiegand wire to decrease to a low enough strength or density until it no longer repulses the field or flux of the Wiegand wire resetting magnetic field from the Wiegand wire resetting magnetic field source thereby causing the strength of the trigger resetting magnetic field, e.g., Wiegand wire resetting magnetic field, or density of the flux lines of the trigger resetting magnetic field coupling with or extending through the Wiegand wire to reach and preferably exceed the same magnetic field strength or magnetic flux density triggering threshold resetting the Wiegand wire thereby enabling the Wiegand wire to be triggered by a pulse sensor triggering magnetic field of an approaching, e.g., another approaching, Wiegand wire pulse sensor triggering magnetic field or source.

In one preferred trigger resettable Wiegand wire pulse sensor of the present invention, the Wiegand wire pulse sensor triggering magnetic field or source has a magnetic field strength, magnetic flux density, gauss or tesla greater than the magnetic field strength, magnetic flux density, gauss or tesla of the Wiegand wire resetting magnetic field or source, preferably at least a plurality of times greater, more preferably at least a plurality of pairs, i.e., at least three, of times greater to ensure its magnetic field and flux has sufficient strength and flux density to (a) repel the magnetic field of the Wiegand wire resetting magnetic field source, and (b) to reach and exceed a high enough density of magnetic flux lines coupling with or extending through the Wiegand wire to trigger the Wiegand wire and output a pulse from the sensor. In at least one preferred embodiment, the trigger reset magnet of each trigger-resettable Wiegand wire pulse sensor constructed in accordance with the present invention has a magnetic field strength, flux density, or gauss of no more than 300 gauss, preferably of no more than 250 gauss, and more preferably of no more than about 200 gauss±25 gauss, and each trigger magnet used with such a trigger-resettable Wiegand wire pulse sensor has a magnetic field strength, flux density, or gauss of at least 900 gauss, preferably of at least 950 gauss, and more preferably of at least about 1000 gauss±100 gauss. In one such trigger resettable Wiegand wire pulse sensor, resetting of the Wiegand wire by the Wiegand wire resetting magnetic field and source also causes triggers the Wiegand wire in resetting the Wiegand wire but does so in a manner that causes the pulse coil to output a pulse of electrical current of opposite polarity to the pulse output when triggered by the Wiegand wire pulse sensor triggering magnetic field and source. If desired, this opposite polarity pulse outputted by the trigger resettable Wiegand wire pulse sensor can be ignored, suppressed such as by using a diode to block and/or another electrical component to shunt the trigger reset outputted pulse or can also be used, such as by a controller, e.g., processor, such as a microcontroller, configured in software and/or firmware, and/or circuitry configured to utilize the trigger reset pulse outputted upon the Wiegand wire resetting magnetic field or source resetting the Wiegand wire of the sensor.

If desired, such a trigger-resettable Wiegand wire pulse sensor can come in the form of a kit or assembly with at least one, preferably at least a plurality, and more preferably at least a plurality of pairs, i.e., at least three, of stronger magnetic field strength or stronger magnetic flux opposite pole or opposite polarity trigger magnets. Permanent magnets suitable for use as trigger magnets and trigger-reset magnets include magnets rare earth Alnico (AlNiCo), samarium cobalt (SmCo5), or neodymium (NdFeB) magnets. In at least one preferred embodiment, the trigger reset magnet of each trigger-resettable Wiegand wire pulse sensor constructed in accordance with the present invention has a magnetic field strength, flux density, or gauss of no more than 300 gauss, preferably of no more than 250 gauss, and more preferably of no more than about 200 gauss±25 gauss, and each trigger magnet used with such a trigger-resettable Wiegand wire pulse sensor has a magnetic field strength, flux density, or gauss of at least 900 gauss, preferably of at least 950 gauss, and more preferably of at least about 1000 gauss±100 gauss. Such a trigger-resettable Wiegand wire pulse sensor can be in the form of a surface mounted or surface mountable electrical component or circuit, such as an integrated circuit, preferably being in the form of a single inline package (SIP), dual inline package (DIP) quadruple inline package (QIP), zig-zag inline package (ZIP), a molded DIP (MDIP), or plastic DIP (PDIP), that includes at least one Wiegand wire, pulse coil coaxially carried by the Wiegand wire, e.g., a coil of wire helically wrapped around the Wiegand wire substantially the length of the Wiegand wire, and the trigger-reset magnet all of which can be molded or otherwise formed into one of the aforementioned electronic package formats having a plurality of electrical leads or outputs which can be soldered or solder mounted, e.g., surface mounted, to a printed circuit board (PCB). If desired, such a trigger-resettable Wiegand wire pulse sensor in accordance with the present invention can further include an onboard processor, such as a microcontroller, configured with firmware, that is in electrical cooperation, e.g., electrically connected, to one of the Wiegand wire and pulse coil. If desired, such a trigger-resettable Wiegand wire pulse sensor in accordance with the present invention can further include one or a plurality of spaced apart Hall sensors, which also can be in electrical cooperation with the processor, with the firmware configured to process signals from each Hall sensor and the pulse coil.

In a preferred embodiment the position sensor, preferably absolute position sensor, is or includes a magnetic flux sensor that has a Wiegand wire and a reset magnet that resets the Wiegand wire when a position magnet that is or serves as a trigger magnet triggers the Wiegand wire thereby causing the Wiegand wire to emit a pulse of electrical current. The reset magnet preferably has a polarity opposite that of the trigger magnet. In one sensor embodiment, the trigger magnet is disposed on one side of the Wiegand wire and the reset magnet is disposed on a side of the Wiegand wire distal to that of the trigger magnet. In one preferred sensor embodiment, the trigger magnet is disposed on one side of the Wiegand wire and the reset magnet is disposed on an opposite side of the Wiegand wire. In one such sensor embodiment, the Wiegand wire is interposed between trigger magnet and reset magnet. In another such sensor embodiment, the Wiegand wire is disposed in a generally intervening relationship between the reset magnet and trigger magnet.

In another sensor embodiment, the trigger magnet and reset magnet form an included angle of 180°±45° with the Wiegand wire that defines a triggering window causing an electrical pulse to be emitted by the Wiegand wire. The triggering magnet causes the Wiegand wire to output an electrical pulse when the trigger magnet forms an included angle of between 135° and 225° with the Wiegand wire that defines a Wiegand triggering window in which the Wiegand wire is triggered to output an electrical pulse therefrom. In another sensor embodiment, the triggering magnet causes the Wiegand wire to output an electrical pulse when the trigger magnet forms an included angle of between 115° and 245° with the Wiegand wire that defines a Wiegand triggering window in which the Wiegand wire is triggered to output an electrical pulse therefrom.

In another preferred sensor embodiment, the trigger magnet and reset magnet are generally inline with one another with one of the reset magnet and trigger magnet disposed between the Wiegand wire and the other one of the reset magnet and trigger magnet. In one such sensor embodiment, the reset magnet is generally interposed between the Wiegand wire and trigger magnet. In another such sensor embodiment, the trigger magnet is disposed in a generally intervening relationship between the Wiegand wire and reset magnet.

The magnetic field strength or the magnetic flux density of the trigger magnet is greater than the magnetic field strength or the magnetic flux density of the reset magnet. the trigger magnet has a magnetic field strength or the magnetic flux density in the vicinity of the Wiegand wire that is greater than the magnetic field strength or the magnetic flux density of the reset magnet in the vicinity of the Wiegand wire. The Wiegand wire and pulse coil wrapped around the Wiegand wire are arranged generally orthogonal to the poles of the trigger magnet and the trigger reset magnet. At least one of the trigger magnet and trigger reset magnet is an elongate cylindrical magnet or an elongate bar magnet arranged generally orthogonal to a lengthwise or longitudinal direction of the Wiegand wire and pulse coil carried by the Wiegand wire. In one sensor embodiment, the trigger magnet and trigger reset magnet are either an elongate cylindrical magnet or an elongate bar magnet arranged generally orthogonal to a lengthwise or longitudinal direction of the Wiegand wire and pulse coil that is carried by, preferably wrapped around, the Wiegand wire. In another sensor embodiment, the trigger magnet and trigger reset magnet has an opposite pole facing toward the Wiegand wire and pulse coil wrapped around the Wiegand wire with the magnetic field and/or magnetic flux lines emanating generally transversely or generally orthogonally to a lengthwise or longitudinal direction of the Wiegand wire and pulse coil carried by, e.g., wrapped around, the Wiegand wire.

The trigger magnet preferably is disposed on one side of the Wiegand wire and the reset magnet is disposed distal to and/or on a side of the Wiegand wire different than the one side the trigger magnet is disposed. In a preferred sensor embodiment, the trigger magnet is disposed on a side of the Wiegand wire opposite that of the reset magnet. In one such embodiment, one of the trigger magnet and reset magnet are disposed at an angle of about 180°±45° relative to the other one of the trigger magnet and reset magnet. In another such embodiment, the reset magnet and trigger magnet are oriented at an acute angle with respect to each other and the Wiegand wire with the Wiegand wire generally disposed interjacent the reset magnet and trigger magnet.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A position sensor comprising:
   a pulse generator comprising a pick-up coil wound around a Wiegand wire;
   a position magnet; and
   a reset magnet,
   wherein the pulse generator and the position magnet are configured to move with respect to one another,
   wherein the pulse generator and the reset magnet are configured to remain stationary with respect to one another, and
   wherein a magnetic flux density of the position magnet is greater than a magnetic flux density of the reset magnet.

2. The position sensor of claim 1, wherein the position magnet is configured to set the Wiegand wire to a first state of polarization to produce a pulse in the pulse generator when the position magnet is proximal to the pulse generator, and wherein the reset magnet resets the Wiegand wire to a second state of polarization when the position magnet is distal to the pulse generator.

3. The position sensor of claim 2, further comprising a controller in communication with the pulse generator, wherein the controller maintains a count based on pulses produced by the pulse generator.

4. The position sensor of claim 1, wherein the position and reset magnets have North and South poles, wherein one pole of the position magnet and one pole of the reset magnet are oriented toward the pulse generator, and wherein the one pole of the position magnet and the one pole of the reset magnet are opposite poles.

5. The position sensor of claim 1, wherein the magnetic flux density of the position magnet is at least 1000 Gauss.

6. The position sensor of claim 1, wherein the magnetic flux density of the reset magnet is less than 200 Gauss.

7. The position sensor of claim 1, further comprising first and second Hall sensors configured to detect a direction of movement of the position magnet with respect to the pulse generator.

8. The position sensor of claim 1, wherein the position magnet is one of a plurality of equidistantly spaced apart position magnets carried by a rotating disk configured to move relative to the pulse generator during rotation sequentially disposing a corresponding one of the position magnets proximal the pulse generator, and each one of the position magnets oriented with the same pole facing the pulse generator.

9. The position sensor of claim 1, wherein the position magnet is one of a plurality of position magnets equidistantly spaced apart along a linear segment of an elongate track configured to move relative to the pulse generator, and wherein each one of the position magnets is oriented with the same pole facing the pulse generator.

10. The position sensor of claim 1 wherein (a) the Wiegand wire, and (b) the reset magnet that resets the Wiegand wire when a position magnet triggers the Wiegand wire causing the Wiegand wire to emit a pulse of electrical current therefrom collectively comprise a magnetic flux sensor.

11. The position sensor of claim 1 wherein the reset magnet is disposed adjacent the pulse generator.

12. The position sensor of claim 11, wherein the pulse generator is generally disposed between the reset magnet and each one of the position magnets carried by the track when disposed proximal to the pulse generator.

13. The position sensor of claim 1 further comprising first and second Hall sensors bracketing the pulse detector and configured to resolve a fine position of a proximal one of the position magnets carried by the track moving relative thereto by interpolation.

14. The position sensor of claim 13 wherein the first and second Hall sensors are located closer to one of the position magnets and the track carrying the position magnets than the pulse detector.

15. The position sensor of claim 1 further comprising first and second Hall sensors and a processor in communication with the Hall sensors, the processor comprising a controller configured to (a) determine coarse position of the track relative to the pulse detector during relative movement therebetween by keeping track of a count of pulses from the pulse detector triggered by movement of a proximal one of the position magnets carried by the track relative thereto, (b) resolve a fine position of the track by interpolating signals from the Hall sensors sensing a proximal one of the position magnets carried by the track during relative movement therebetween, and (c) determine a direction of movement of the track relative thereto during relative movement therebetween.

16. The position sensor of claim 1 wherein the pulse detector and reset magnet comprise a trigger-resettable Wiegand wire pulse sensor having the form of a surface mounted or surface mountable electrical component.

17. The position sensor of claim 16 wherein the trigger-resettable Wiegand wire pulse sensor comprises an integrated circuit having the form of one of a single inline package (SIP), a dual inline package (DIP), a quadruple inline package (QIP), a zig-zag inline package (ZIP), a molded DIP (MDIP), or a plastic DIP (PDIP).

18. The position sensor of claim 17 wherein the trigger-resettable Wiegand wire pulse sensor further comprises first and second Hall sensors and a processor in communication with the Hall sensors and the pulse detector.

19. The position sensor of claim 18 wherein the processor is configured to (a) determine coarse position of the track relative to the pulse detector during relative movement therebetween by keeping track of a count of pulses from the pulse detector triggered by movement of a proximal one of the position magnets carried by the track relative to the pulse detector, (b) resolve a fine position of the track by interpolating signals from the Hall sensors sensing a magnetic flux density or magnetic field of the proximal one of the position magnets carried by the track during relative movement therebetween, and (c) determine a direction of movement of the track relative thereto using signals from the Hall sensors sensing the magnetic flux density or magnetic field of the proximal one of the position magnets carried by the track during relative movement therebetween.

20. An absolute position sensor comprising:
 a detector comprising:
  a pulse generator including a pick-up coil wound around a Wiegand wire;
  a plurality of Hall sensors;
  a reset magnet; and
 a track carrying a plurality of position magnets spaced apart along the track,
 wherein the pulse generator and the track carrying the plurality of position magnets are configured to move with respect to one another,
 wherein the pulse generator and the reset magnet are configured to remain stationary with respect to one another,
 wherein magnetic flux densities of the position magnets are greater than a magnetic flux density of the reset magnet, and
 wherein the detector is configured to increment or decrement a coarse position counter and resolve a fine position between position magnets using interpolation.

21. The absolute position sensor of claim 20, wherein each position magnet is configured to set the Wiegand wire to a first state of polarization to produce a pulse in the pulse generator when one of the position magnets is proximal to the pulse generator, and wherein the reset magnet resets the Wiegand wire to a second state of polarization when the one of the position magnets is distal to the pulse generator.

22. The position sensor of claim 21, wherein the detector further includes a controller in communication with the pulse generator and the Hall sensors, wherein the controller is configured to increment or decrement the coarse position counter based on pulses produced by the pulse generator.

23. The position sensor of claim 22 wherein the controller is further configured (a) to receive signals outputted by the Hall sensors in response to the Hall sensors sensing a magnetic field or magnetic flux of one of the position magnets disposed adjacent the Hall sensors, and (b) resolve fine position by interpolating the signals outputted by the Hall sensor in response to the Hall sensors sensing the magnetic field or magnetic flux of the one of the position magnets disposed adjacent the Hall sensors.

24. The position sensor of claim 20, wherein the position and reset magnets have North and South poles, wherein common poles of the position magnets and one pole of the reset magnet are oriented toward the pulse generator, and wherein the one pole of the reset magnet is an opposite pole from the common poles of the position magnets.

25. The position sensor of claim 24, wherein the pulse generator is configured to remain between the position magnets on a first side and the reset magnet on a second side.

26. The position sensor of claim 20, wherein the magnetic flux densities of each one of the position magnets is at least 900 Gauss.

27. The position sensor of claim 20, wherein the magnetic flux density of the reset magnet is no more than 300 Gauss.

28. The position sensor of claim 20, wherein the pulse generator is one of a plurality of pulse generator and the reset magnet is one of a plurality of reset magnets, and wherein there are an equal number of pulse generators and reset magnets with each pulse generator having a corresponding reset magnet disposed adjacent thereto that remains stationary relative thereto.

29. The position sensor of claim 28 wherein the track carrying the plurality of position magnets and the plurality of position magnets carried by the track are configured to move substantially in unison relative to each one of the plurality of pulse generators, and wherein each one of the position magnets carried by the track triggers a corresponding one of the pulse generators as the respective one of the position magnets carried by the track passes thereby during movement of the track and the position magnets carried by the track relative thereto.

30. The position sensor of claim 20 wherein the reset magnet comprises a permanent magnet disposed adjacent the pulse generator and which remains stationary relative to the pulse generator.

31. The position sensor of claim 30 wherein the pulse generator is disposed between the reset magnet and each one of the position magnets passing by the pulse generator during relative movement therebetween.

32. The position sensor of claim 20 wherein the track comprises one of (a) a straight elongate track carrying at least a plurality of pairs of spaced apart position magnets, and (b) a circular or annular track carrying at least a plurality of pairs of spaced apart position magnets.

* * * * *